United States Patent [19]

Boutni

[11] Patent Number: 4,868,244

[45] Date of Patent: Sep. 19, 1989

[54] LOW-GLOSS CARBONATE POLYMER BLENDS

[75] Inventor: Omar M. Boutni, Mt. Vernon, Ind.

[73] Assignee: General Electric Company, Mt. Vernon, Ind.

[21] Appl. No.: 289,940

[22] Filed: Dec. 27, 1988

[51] Int. Cl.$^4$ .............................................. C08L 69/00
[52] U.S. Cl. ........................................ 525/67; 525/92
[58] Field of Search .................... 525/67, 92, 133, 902

[56] References Cited

U.S. PATENT DOCUMENTS

| | | | |
|---|---|---|---|
| 3,991,009 | 11/1976 | Margotte et al. | 260/42.180 |
| 4,148,842 | 4/1979 | Yu et al. | 525/148 |
| 4,226,950 | 10/1980 | Holub et al. | 525/67 |
| 4,460,742 | 7/1984 | Kishida et al. | 525/64 |
| 4,579,909 | 4/1986 | Giles et al. | 525/148 |
| 4,677,162 | 6/1987 | Grigo et al. | 525/67 |
| 4,731,414 | 3/1988 | Ting | 525/71 |
| 4,742,104 | 5/1988 | Lindner et al. | 524/409 |

OTHER PUBLICATIONS

Rupponick, K., "ASA-PC-An Interesting Alternative to ABS/PC", Kunststoffe-German Plastics, 75(10), 33-5 (Oct. '85) (English).

*Primary Examiner*—Theodore E. Pertilla
*Attorney, Agent, or Firm*—Joseph T. Eisele; Martin B. Barancik

[57] ABSTRACT

A low-gloss thermoplastic blend contains an aromatic carbonate polymer, strength-improving additives such as an elastomeric block copolymer and a core-shell acrylic polymer, and a gloss-reducing glycidyl (meth)acrylate polymer.

8 Claims, No Drawings

LOW-GLOSS CARBONATE POLYMER BLENDS

BACKGROUND OF THE INVENTION

1. Field of the Invention

This invention relates to blends of aromatic carbonate polymers with certain strength-improving polymeric additives, further blended with another specific polymer for gloss reduction.

2. Brief Description of the Prior Art

Molded products made of thermoplastic resins are frequently glossy. For some purposes, this is desirable, however, a matte or non-glossy surface is often preferable for products such as housings for computer terminals, typewriters, miscellaneous electrical appliances and certan automotive parts. There is substantial commercial need for non-glossy plastics.

Elimination of gloss by surface embossing requires a separate step and adds cost, moreover, subsequent abrasion may remove the embossed matte surface and cause the glass to reappear. The addition of a delustering agent such as finely-divided silica, silicate, alumina, or other mineral filler may have a detrimental effect on the physical properties such as impact strength. Attempts to add a polymeric delustering agent frequently also have deleterious effects on physical properties, not only impact strength but also on heat distortion temperature, weldline strength, weathering, light stability, and other important properties.

The reduction of glass in certain specified thermoplastic blends by adding a special copolymer crosslinked by means of allyl functionality has been described in U.S. Pat. No. 4,460,742.

Many blends of carbonate polymers with other thermoplastics are known in the art. The blending resin is chosen for properties such as impact strength, behavior on aging, and processability. However, it is often found that such blends tend to be glossier than is desired, for example above about 100 by the ASTM gloss measurement method, and there is a need for effective means of reducing the gloss without undue loss of the other good properties of the blend.

The problem that the compounder faces is that as some properties improve upon blending, other properties may change in an undesirable direction. This is a serious problem in the blending of aromatic carbonate polymers with other resins, many of which while imparting desirable strength properties, simultaneously impart excessive gloss. Such a circumstance occurs, for example, in blending polycarbonates with a styrene-olefin block elastomers for impact improvement along with an core-shell acrylic impact modifier added also for impact improvement and for better weldline strength. In this instance, upon addition of the acrylic impact modifier to the other two components, the gloss of the resultant three component blend rises to undesirable high levels.

Broadly, means are desired for lowering the gloss of aromatic carbonate polymers blends with strength-improving resins when such blends are glossier than desired. More narrowly, in the specific case desribed above, means are desired for lowering the excessive gloss of polycarbonate blends with styrene-olefin block elastomers and acrylic core-shell impact modifiers.

SUMMARY OF THE INVENTION

The present invention, in its broadest scope, provides low-gloss blends comprising an aromatic carbonate polymer, one or more thermoplastic additives present in strength-improving amounts, and an effective gloss reducing amount of a polymer of glycidyl (meth)acrylate.

A particular embodiment of the invention provides low-gloss blends comprising:
(a) an aromatic carbonate polymer;
(b) an impact modifying amount of a thermoplastic elastomer which is a block copolymer comprising at least one polystyrene block and at least one rubbery polyolefin block;
(c) at least one core-shell acrylic impact modifier which when added to said blend in amounts sufficient to improve strength (such as impact and/or weldline strength) permits the blend to have undesirably high gloss; and
(d) a gloss reducing amount of a copolymer of glycidyl (meth)acrylate with styrene. The term (meth)acrylate is used herein to mean either acrylate or methacrylate.

The reduction of gloss by adding the last named component together with the thermoplastic elastomer block polymer is surprising in that addition of the same component to the polycarbonate alone does not reduce gloss. The beneficial effect of the additive (d) in lowering gloss in the blends is exerted by such low levels of (d) that there is no adverse effect on physical properties such as weldline strength.

DETAILED DESCRIPTION OF THE INVENTION

In its broadest scope, the compositions of the invention are low-gloss blends comprising:

an aromatic carbonate polymer, which can be a polycarbonate or a polyester-carbonate;

an impact modifier which can be a thermoplastic elastomer such as a block copolymer with styrene blocks and rubbery polyolefin blocks and/or an acrylic shell-core impact modified, said impact modified or combination of impact modifiers being present in amounts with elevate strength but which result in excessive gloss in the blend, and a gloss reducing amount of a glycidyl (meth)acrylate polymer which can be a homopolymer or copolymer.

A preferred embodiment of the invention comprises a four-component polyblend comprising:
(a) an aromatic carbonate polymer;
(b) an impact improving amount of a thermoplastic elastomer which is a block copolymer comprising at least one polystyrene block and at least one rubbery polyolefin block;
(c) a strength- (especially weldline-strength-) improving amount of a core-shell acrylic graft copolymer impact modifier; and
(d) a glass reducing amount of a copolymer of glycidyl (meth)acrylate with styrene.

An even more preferred composition of the invention comprises:
(a) from about 25% to about 90% by weight (preferably about 35% to about 70%) of an aromatic polycarbonate;
(b) from about 75% to about 10% by weight (preferably about 65% to about 30%) of a block copolymer comprised of styrene blocks and rubbery polyolefin blocks comprised of ethylene-butylene or ethylene-proplyene copolymer blocks;

(c) from about 1% to about 20% by weight (preferably about 2% to about 10%) of a core-shell acrylic graft copolymer impact modified; and (d) an effective gloss-reducing amount of a copolymer of glycidyl methacrylate with styrene.

The resin percentages of (a), (b), (c) and (d) should essentially add up to 100%, not counting any other additives such as fillers, pigments, processing aids or the like.

The aromatic carbonate polymers useful as component (a) include polycarbonates as well as polyester-carbonates. The method of preparation of polycarbonates by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. The temperature at which the phosgeneration reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

The dihydric phenols employed are known, and the reactive groups are the two phenolic hydroxyl groups. Some of the dihydric phenols are represented by the general formula:

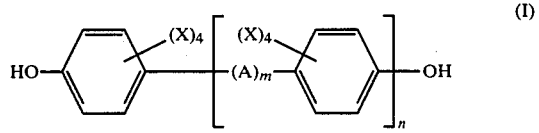

wherein A is a divalent hydrocarbon radical containing from 1 to about 15 carbon atoms; a substituted divalent hydrocarbon radical containing from 1 to about 15 carbon atoms and substituent groups such as halogen;

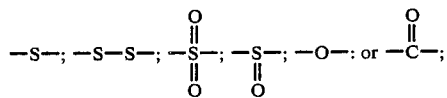

wherein each X is independently selected from the group consisting of hydrogen, halogen, and a monovalent hydrocarbon radical such as an alkyl group of from 1 to about 8 carbon atoms, an aryl group of from 6-18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 5.

Typical of some of the dihydric phenols that can be employed in the practice of the present invention are bis-phenols such as (4-hydroxyphenyl)methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bis-chloroformates of 2,2-bis(4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenol) ethane, trimellitic anhydride, trimellitic acid, trimellitoyl trichloride, 4- chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are 1,1,1-tri(4-hydroxphenyl)ethane, trimellitic anhydride or trimellitic acid or their haloformyl derivatives. Also included herein are blends of a linear polycarbonate and a branched polycarbonate.

The aromatic carbonate polymers suitable for use as component (a) of the compositions of the invention include polyester-carbonates, also known as copolyesterpolycarbonates, i.e., resins which contain, in addition to recurring polycarbonate chain units of the formula:

(IIa)

wherein D is a divalent aromatic radical of the dihydric phenol employed in the polymerization reaction, repeating or recurring carboxylate units, for example of the formula:

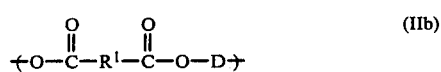
(IIb)

wherein D is as defined above and $R^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any discarboxylic acid conventionally used in the preparation of linear polyesters may be utilized in the preparation of the copolyester-carbonate resins of the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

$$HOOC-R^1-COOH \qquad (III)$$

wherein $R^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

$$-E-$$

wherein E is a divalent alkylene or alkylidene group. E may also consist of two or more alkylene or alkylidene groups, connected to a non-alkylene or alkylidene group, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. For purposes of the present invention, the aromatic dicarboxylic acids are preferred. Thus, in the preferred aromatic difunctional carboxylic acids, $R^1$ is an aromatic radical such as phenylene, biphenylene, naphthylene, or substituted phenylene. Some non-limiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like; an organic group such as the nitro group; and organic group such as alkyl; or an oxy group such as alkoxy, it being only necessary that Y be inert to and unaffected by the reactants and the reaction conditions. Particularly useful aromatic dicarboxylic acids are those represented by the general formula:

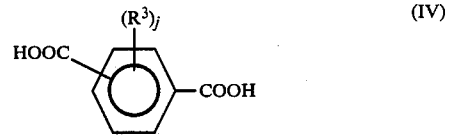
(IV)

wherein j is a positive whole integer having a value of from 0 to 4 inclusive; and each $R^3$ is independently selected from the group consisting of alkyl radicals, preferably lower alkyl (1 to about 6 C atoms).

Mixtures of these dicarboxylic acids may be employed. Therefore, where the term dicarboxylic acid is used herein it is to be understood that this term includes mixtures of two or more dicarboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivative derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isopthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

The preferred polycarbonates for use in the present invention are those derived from bisphenol A and phosgene and having an intrinsic viscosity of about 0.3 to about 1.5 deciliters per gram in methylene chloride at 25°.

The components (b) and (c) most broadly are any additive resins or combination thereof which when added to (a) to elevate strength properties at the same time give blends which have undesirably high glass. In the preferred embodiment, the component (b) is a thermoplastic elastomer made by block copolymerization, and having polystyrene blocks and rubbery polyolefin blocks. Such polymers can be diblock, triblock, or higher-multiblock and can be linear, or branched. The preferred thermoplastic elastomer of this type are block copolymers having styrene blocks and ethylenebutylene blocks (these latter could be the result of either copolymerization of ethylene and butylene monomer or the result of hydrogenation of the 1,2 and 1,4- units from a polybutadiene block). For purposes of this invention, it does not matter which of these two methods is used to produce the ethylene-butylene blocks. Block copolymers with polystyrene blocks and rubbery ethylenepropylene blocks are also within the preferred group for use as component (b). Such copolymers, available as the Kraton G polymers from Shell Chemical Co. have polystyrene blocks of molecular weight about 7,000–38,000, styrene contents of about 13 to about 37 wt.%, and triblock to diblock ratios of from 100:0 to 0:100. A particularly advantageous copolymer of this type is Kraton G1729X which is a block copolymer with polystyrene blocks and rubbery ethylene-butylene blocks, a polystyrene block molecular weight of about 15,000, a styrene content of about 17%, and a triblock to diblock ratio of about 20:80.

The component (c) is an acrylic impact modifier, typically a shell-core acrylic polymer having an elastomeric core and a thermoplastic nonelastomeric shell, polymerized on the core with some means for tight bonding of shell to core. The bonding means is typically graft polymerization and/or interpenetration of chains across the shell-core interface. Such acrylic impact modifiers are exemplified by the Acryloid (Paraloid) KM series made by Rohm & Haas Co. These are graft copolymers of acrylic monomer such as methyl methacrylate and other acrylic monomers onto a rubbery core. Acryloid KM330 and other members of the Acryloid KM300 series are multiple stage polymers having a rubbery acrylic polymer first stage (core) and a hard thermoplastic acrylic second stage (shell) as described further in U.S. Pat. No. 4,06,202. Acryloid KM683 and other members of the Acryloid KM600 and KM700 series are multiple stage polymers with a rubbery styrene-butadiene copolymer rubber first stage (core) and a hard thermoplastic acrylic second stage (shell).

The component (d) is a polymer of glycidyl (meth)acrylate, preferably methacrylate, and preferably a copolymer with styrene and optionally with an additional acrylic comonomer (termonomer) such as acrylonitrile and alkyl (meth)acrylates (with alkyl other than glycidyl). A number of these are available commercially under the trade name Blemmer Resins, from Nippon Oil & Fats Co. Ltd. and Marubeni Corp. Ltd. (Japan). Variants of these resins where the styrene is substituted with alkyl or halogen are also usable.

Broadly, these gloss reducing additives are copolymers of the following structure:

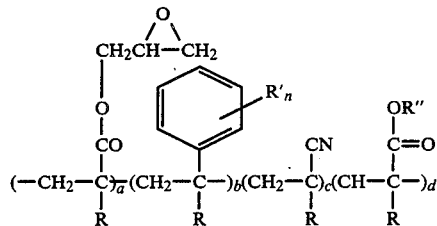

where
R=alkyl (preferably methyl) or hydrogen
R'=alkyl, hydrogen, or halogen (especially Br) and n=0–5
R''=alkyl ($\leq$C18), aryl, alkylaryl, or hydrogen
a=1–50%, b=0–99% (preferably 1–99%),
c=0–50%, d=0–50%, and
a+b+c+d=100%

These copolymers can be prepared by various techniques for the polymerization of vinyl monomers such as bulk and emulsion polymerization.

An effective amount of this component (d) is found to be in the range of about 0.05 to about 10%, preferably about 0.1% to about 5%, all by weight calculated on the basis of the total of (a), (b), (c) and (d). Lesser amounts of (d) may give insufficient gloss reduction, greater amounts are excessively costly and adversely affect physical properties of the blend.

The blends of the invention may be further modified by the addition of other types of additives known to the art of plastics compounding. Such additives can include for example fillers (such as clay or talc), reinfrocing agents (such as glass fibers), impact modifiers, other resins, antistats, plasticizers, flow promoters and other processing aids, stabilizers, colorants, mold release agents, flame retardants, ultraviolet screening agents, and the like.

The production of the compositions of the invention is done by any of the operations known for the blending of thermoplastics, such as in a kneading machine such as a Banbury mixer or an extruder, or solvent blending. The sequence of addition is not critical but all components should be thoroughly blended. Blending can be done continuously or batchwise.

The invention will be better understood with reference to the following examples, which are presented for purposes of illustration rather than for limitation, and which set forth the best mode contemplated for carrying out the invention.

EXAMPLES 1 and 2

Samples were prepared by melt blending the compositions indicated in the table below in a twin screw extruder at 220–270° C. and 100–200 rpm. The blended and extruded material was then pelletized, dried and injection molded at about 240° C. to prepare test specimens. The 60° and 80° gloss was measured by ASTM test method D-1003 using a Gardner gloss meter. Other physical properties were measured on injection molded samples using the following ASTM test methods: Tensile properties, D638; Weldline strength, D256; impact by notched Izod, D256; heat deflection temperature, D648-56 at a load of 1.82 MPa.

|  | Example No.: | |
|---|---|---|
|  | 1 | 2 |
| Composition (wt. %): | | |
| Polycarbonate (note 1) | 83 | 83 |
| Kraton ® G1727X (note 2) | 10 | 10 |
| Acryloid ® KM330 (note 3) | — | 5 |
| Acryloid ® KM653 (note 4) | 5 | — |
| Blemmer CP-15 (note 5) | 2 | 2 |
| Irganox ® 1076 (note 6) | 0.1 phr | 0.1 phr |
| Irgafos ® 168 (note 7) | 0.05 phr | 0.05 phr |
| Properties: | | |
| 60° gloss | 40 | 23 |
| 80° gloss | 53 | 36 |
| Tensile yield, (MPa) | 47.9 | 47.4 |
| Tensile break, (MPa) | 59.1 | 45.4 |
| Elongation, (%) | 82 | 60 |
| Flexural yield, (MPa) | 68.3 | 67.5 |
| Flexural modulus, (MPa) | 1720 | 1720 |
| 3.175 mm N. Izod (J/m) | 87 | 608 |
| 6.35 mm N. Izod (J/m) | 6.1 | 5.8 |
| DTUL at 264 psi (°F.) | 262 | 266 |

Notes to table:
1. Lexan 200 polycarbonate 145; a polycarbonate from bisphenol A and phosgene by General Electric Co.
2. A styrene-butadiene block copolymer made by Shell Chemical Co. which is a block copolymer with polystyrene blocks and rubbery ethylene-butylene blocks, a polystyrene block mol. wt. of about 15,000, a styrene content of about 17%, and a triblock to diblock ratio of about 20:80.
3. Trademark of Rohm and Haas Co. for an core-shell acrylic impact modifier comprising as monomers n-butyl acrylate, butylene glycol diacrylate, methyl methacrylate, and allyl acrylate (80/0.35/20/0.3 ratio by weight) as described in U.S. Pat. No. 4,731,414.
4. As 3 but wherein the core is believed to be a methyl methacrylate-butadiene-styrene elastomer.
5. Blemmer GMA copolymer resin made by Nippon Oil & Fats Co. (Japan) identified as a copolymer of 15% glycidyl methacrylate with methyl methacrylate, styrene and an alkyl acrylate.
6. An antioxidant, having the structure octadecyl 3-(3,5-di-t-butyl-4-hydroxyphenyl)propionate, made by Ciba-Geigy Corp.
7. An antioxidant tris(2,4-di-t-butylphenyl) phosphite by Ciba-Geigy Corp.

This data shows a combination of a preferred Kraton ® thermoplastic elastomer and a preferred KM acrylic impact modifier, affording a particularly low-gloss blend with good weld line strength, impact strength and other desirable physical properties.

EXAMPLES 3-8

In a manner siimlar to the foregoing example, samples were prepared and tested as described in the table below:

|  | Example No.: | | | | | |
|---|---|---|---|---|---|---|
|  | 3 | 4 | 5 | 6 | 7 | 8 |
| Polycarbonate[1] | 90 | 88 | 83 | 83 | 85 | 85 |
| Kraton ® G1727X[2] | 10 | 10 | 10 | 10 | 10 | 10 |
| Acryloid KM330[3] | — | — | 5 | — | 5 | — |
| Acryloid KM653[4] | — | — | — | 5 | — | 5 |
| Blemmer CP-15[5] | — | 2 | 2 | 2 | — | — |
| Properties: | | | | | | |
| 60 deg. gloss | 56.6 | 61.8 | 62.7 | 85.7 | 89.4 | 91.4 |
| 3.175 mm N. Izod (J/m) | 576 | 678 | 539 | 587 | 630 | 630 |
| 7.35 mm N. Izod (J/m) | 470 | 235 | 518 | 406 | 352 | 363 |
| Weldline strength (J) | 1.6 | 0.9 | 2.7 | 2.0 | 1.5 | 1.5 |
| Kaisha Index[6] (Ce) | 1580 | 1420 | 1880 | 1250 | 1580 | 1260 |

Notes to table:
1-5: As in previous examples.
[6] A measure of melt viscosity; method described in U.S. Pat. No. 4,735,978, column 5 and reported in centiseconds.

These data show that by the addition of both the Kraton ® and the Acryloid KM330 or KM653, a favorable combination of impact strength and weld line strength is achieved but the addition of the KM330 or KM653 causes gloss to rise substantially above the glass values seen with the Kraton ® addition alone. The Blemmer resin overcomes this difficulty.

It was found that gloss was reduced to a lesser but still useful degree in blends of the polycarbonate with the Acryloids, even when the Kraton ® thermoplastic elastomer was omitted, as shown by examples 9-14.

|  | Example No.: | | | | | |
|---|---|---|---|---|---|---|
|  | 9 | 10 | 11 | 12 | 13 | 14 |
| Polycarbonate[1] | 100 | 98 | 95 | 93 | 95 | 93 |
| Acryloid KM330[3] | — | — | 5 | 5 | — | — |
| Acryloid KM653[4] | — | — | — | — | 5 | 5 |
| Blemmer CP-15[5] | — | 2 | — | 2 | — | 2 |
| Properties: | | | | | | |
| 60° gloss | >100 | >100 | >100 | 86.4 | >100 | 89.5 |

Notes to Table: see preceding tables.

Addition of component (d) to the polycarbonate resin alone did not reduce gloss, which remained above 100.

Obviously, other modifications and variations of the present invention are possible in the light of the above teachings. It is, therefore, to be udnerstood that changes may be made in the particular embodiments of the invention described which are within the full intended scope of the invention as defined by the appended claims.

What is claimed is:
1. A low-gloss thermoplastic blend comprising:
 (a) an aromatic carbonate polymer;
 (b) an impact modifying amount of a thermoplastic elastomer which is a block copolymer comprising at least one polystyrene block and at least one rubbery polyolefin block;
 (c) at least one core-shell acrylic polymer which when added in amounts sufficient to improve strength permits said blend to have undesirably high gloss; and
 (d) a gloss reducing amount of a copolymer of glycidyl methacrylate with styrene.
2. A low-gloss thermoplastic blend defined in claim 1 wherein said aromatic carbonate polymer (a) is a ploycarbonate present at from about 25% to about 90% by weight, said thermoplastic elastomer (b) is present at from about 75% to about 10% by weight, said acrylic polymer (c) is present at from about 1% to about 20% by weight, and said copolyemr of glycidyl methacrylate (d) is present at an effective gloss reducing amount.

3. A low-gloss thermoplastic blend defined in claim 1 wherein said aromatic carbonate polymer (a) is a polycarbonate present at from about 25% to about 90% by weight, said thermoplastic elastomer (b) is present at from about 75% to about 10% by weight, said acrylic polymer (c) is present at from about 1% to about 20% by weight, and said copolymer of glycidyl methacrylate (d) is present at an about 0.05% to about 10% by weight.

4. A low-gloss thermoplastic blend defined in claim 1 wherein said aromatic carbonate polymer (a) is a polycarbonate present at from about 35% to about 70% by weight, said thermoplastic elastomer (b) is present at from about 65% to about 30% by weight, said acrylic polymer (c) is present at from about 2% to about 10% by weight, and said copolymer of glycidyl methacrylate (d) is present at from about 0.1% to about 5% by weight.

5. The low-gloss thermoplastic blend defined in claim 1 wherein said polycarbonate is derived principally from bisphenol A and phosgene.

6. The low-gloss thermoplastic blend defined in claim 1 wherein said block copolymer is comprised of styrene blocks and ethylene-butylene blocks.

7. The low-gloss thermoplastic blend defined in claim 1 wherein said acrylic impact modifier has a rubbery core of acrylic copolymer.

8. The low-gloss thermoplastic blend defined in claim 1 wherein said acrylic impact modifier has a rubbery core of a butadiene polymer.

* * * * *

UNITED STATES PATENT AND TRADEMARK OFFICE
CERTIFICATE OF CORRECTION

PATENT NO. : 4,868,244

DATED : September 19, 1989

INVENTOR(S) : Omar Mohamed Boutni

It is certified that error appears in the above-identified patent and that said Letters Patent is hereby corrected as shown below:

Col. 1, line 30
Delete "glass" and add "gloss"

Col. 2, line 40
Delete first "modified" and add "modifier"
Delete second "modified" and add "modifier"

Col. 2, line 57
Delete "glass" and add "gloss"

Col. 3, line 3
Delete "modified" and add "modifier"

Col. 7, line 14
Delete "glass" and add "gloss"

Col. 7, line 20
Delete "elastomer" and add "elastomers"

Col. 7, line 56
Delete "4,06,202" and add "4,096,202"

Col. 10, line 2
Delete "glass" and add "gloss"

UNITED STATES PATENT AND TRADEMARK OFFICE
CERTIFICATE OF CORRECTION

PATENT NO.   :  4,868,244

DATED        :  September 19, 1989

INVENTOR(S)  :  Omar Mohamed Boutni

It is certified that error appears in the above-identified patent and that said Letters Patent is hereby corrected as shown below:

```
Col. 10, line 25
Delete "udnerstood" and add "understood"
```

Signed and Sealed this

Thirtieth Day of October, 1990

Attest:

HARRY F. MANBECK, JR.

*Attesting Officer*   *Commissioner of Patents and Trademarks*